UNITED STATES PATENT OFFICE.

VICTOR TRIBOUILLET AND LOUIS A. DE BESAUCÈLE, OF PARIS, FRANCE.

IMPROVEMENT IN PROCESSES OF MANUFACTURING SOLID COLLODION.

Specification forming part of Letters Patent No. 216,474, dated June 10, 1879; application filed February 6, 1879.

*To all whom it may concern:*

Be it known that we, VICTOR TRIBOUILLET and LOUIS AUGUSTE DE BESAUCÈLE, both of Paris, in the Republic of France, have invented a certain new and useful Improvement in the Process of Manufacturing Solid Collodion or Pyroxyline, of which improvement the following is a full, clear, and exact description.

The object of this invention is the production of an artificial material called "pyroxyline," which is useful for making imitations of different costly or precious materials, such as artificial ivory, shell, malachite, sea-green celadon, lapis-lazuli, turquoise, coral, amber, jade, jasper, onyx, white, black, and colored marbles, polished or unpolished; also, hard wood, ebony, and various other substances.

The material may be hard, brittle, or flexible, according to the use to which it is to be applied.

Heretofore artificial or factitious substances, such as above indicated, have been prepared from pyroxyle, nitro-cellulose, or gun-cotton by means of liquid and solid solvents—such as a mixture of ether and alcohol and camphor—a paste being ordinarily first formed, which is then solidified by heat and pressure, the gun-cotton used being itself prepared by ordinary and well-known processes, which need not be here described.

This invention consists, first, in a particular process of preparing the pyroxyle or nitro-cellulose; and, second, in manufacturing pyroxyline from the pyroxyle so prepared.

We will now proceed to describe the several steps and different operations which constitute our new process.

The materials employed are papers of various kinds, rags of cotton, linen, or hemp, well cleaned, and particularly free from greasy matters, certain white woods, the stems of most fibrous plants, especially sparta, and all vegetables composed mostly of cellulose—that is to say, which contain very little incrustating matter. The material is dried completely in a stove at the temperature of about 100° centigrade, and is then broken and divided.

To effect the transformation of the cellulose into pyroxyle, gun-cotton, or nitro-cellulose, we employ three parts of sulphuric acid at 66° Baumé, and two parts of concentrated nitric acid, and we dissolve therein nitrous gas, which renders the pyroxyle more soluble.

The cellulose is first worked with the acid in a flat basin, and then in a second basin, where the whole is agitated energetically for ten or fifteen minutes. Both of these basins are glazed, and are provided with glazed covers which close them entirely, in order that the air, always more or less charged with dampness, may not weaken the acids, and also to protect the workmen from escaping acid fumes. The covers may be made to open like a window, and on top there is a hopper or shaker, closed with a larger valve. Laterally there are provided two openings with rubber sleeves, through which the arms for stirring the mass may be passed.

The material thus treated with acid is taken out the flat basin, and compressed in cylindrical vessels perforated on the sides and bottom, and provided with pistons operated by screw-pressure. The liquid which runs out is received in a special reservoir.

The compressed cakes are taken out of the cylindrical vessels and immersed in a covered vessel containing concentrated acid. They are then broken with a sort of trowel, and the whole is agitated until a complete solution of the cellulose is effected. The material is allowed to run off into a cylindrical vessel with a piston, and is pressed energetically therein. The acids which run off may be used to treat the cellulose in the first operation in the first flat basin.

The acids may be economized by employing the bath after it has been used, the bath being heated to 30° or 35° centigrade; but then the material must remain therein several hours. The addition may also be made to a bath which is to be reused of about one-third part of its weight of sulphuric and nitric acids mixed, or of sulphuric acids alone, or of sulphate or bisulphate of soda or other sulphate or bisulphate, thoroughly dried and in powder. The pyroxyle or nitro-cellulose thus obtained is then deprived of the acid which it yet contains. To accomplish this it is washed and then pressed; the divided material is again washed, and received on a series of filters, where it is subjected to a careful washing. It is now washed in water containing a slight proportion of carbonate of soda, or ammoniacal gas, or silicate of soda. This part of the process is finished by the treatment with pure water and drying by means of a current of air or energetic pressure. The residual acids can be utilized for divers uses.

The pyroxyle prepared as aforestated serves for the manufacture of pyroxyline, the mode of proceeding being as follows: The pyroxyle or nitro-cellulose is treated with solid or liquid solvents, as required. The latter are preferably employed for making transparent or even translucid pyroxyline, as the solution may be filtered, then distilled in an alembic to separate the solvent. The pyroxyline thus left in paste can be readily molded. The molded article is afterward thoroughly dried.

To make pyroxyline resembling ivory or other opaque bodies, we employ as a solvent camphor macerated with water in the proportions of forty-two to fifty parts of solid camphor to one hundred parts of dry pyroxyle. The mixture, rendered homogeneous, is wrapped in stout strong fabric, then placed in an envelope or a cloth of horse-hair, and placed between the platens of a hot press and pressed for an hour or even longer. The cakes which are formed between the plates may then be put under the action of the hot cylinder-press; then placed in the apparatus, in which a vacuum is maintained in the presence of known drying materials, such as chloride of calcium or sulphuric acid, until every trace of moisture is removed. The thin plates may be united by heat and pressure with or without softening by means of alcohol or ether.

To accomplish the heating under pressure, instead of ordinary steam, superheated steam, heated air, or other gas may be employed, or even a liquid raised to a temperature which should not fall below 100° centigrade, as that temperature is necessary to dissolve pyroxyle or nitro-cellulose in camphor.

To make colored objects, all kinds of resinous and other materials or coloring-matters may be introduced, and likewise pastes of uniform tint or marbleized may be made.

The pyroxyline may be made almost uninflammable by washing the nitro-cellulose or pyroxyle with a solution of silicate of soda before mixing it with its solvents, or by the introduction of phosphate of ammonia or soda, borate of lead, or, in a word, any of the more fusible fluxes employed in painting on porcelain or glass.

Having thus described our said invention, and the manner in which the same is or may be carried into effect, what we claim, and desire to secure by Letters Patent, is as follows:

1. The process of preparing pyroxyle or nitro-cellulose, the same consisting in treating the dried cellulose with acids in closed glazed vessels, and in following said treatment with pressings, washing, and drying, substantially as described.

2. The process of making pyroxyline, the same consisting in preparing pyroxyle or nitro-cellulose by the treatment of dried cellulose with acids, followed by pressings, washing, and drying, and in treating the pyroxyle so prepared with solvents, liquid or solid, such as camphor, with or without the addition of coloring or other materials, substantially as described, the product thus obtained being adapted, by molding, to serve for the manufacture of various articles, as set forth.

In testimony whereof we have signed our names to this specification before two subscribing witnesses.

V. TRIBOUILLET.
A. DE BESAUCÈLE.

Witnesses:
  ROBT. M. HOOPER,
  A. CALEY.